(No Model.) 5 Sheets—Sheet 1.
G. W. BALDRIGE.
TYPE WRITING MACHINE.
No. 339,129. Patented Apr. 6, 1886.
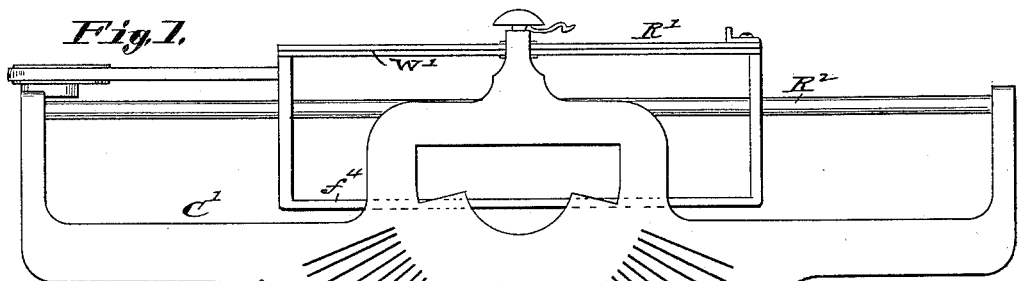
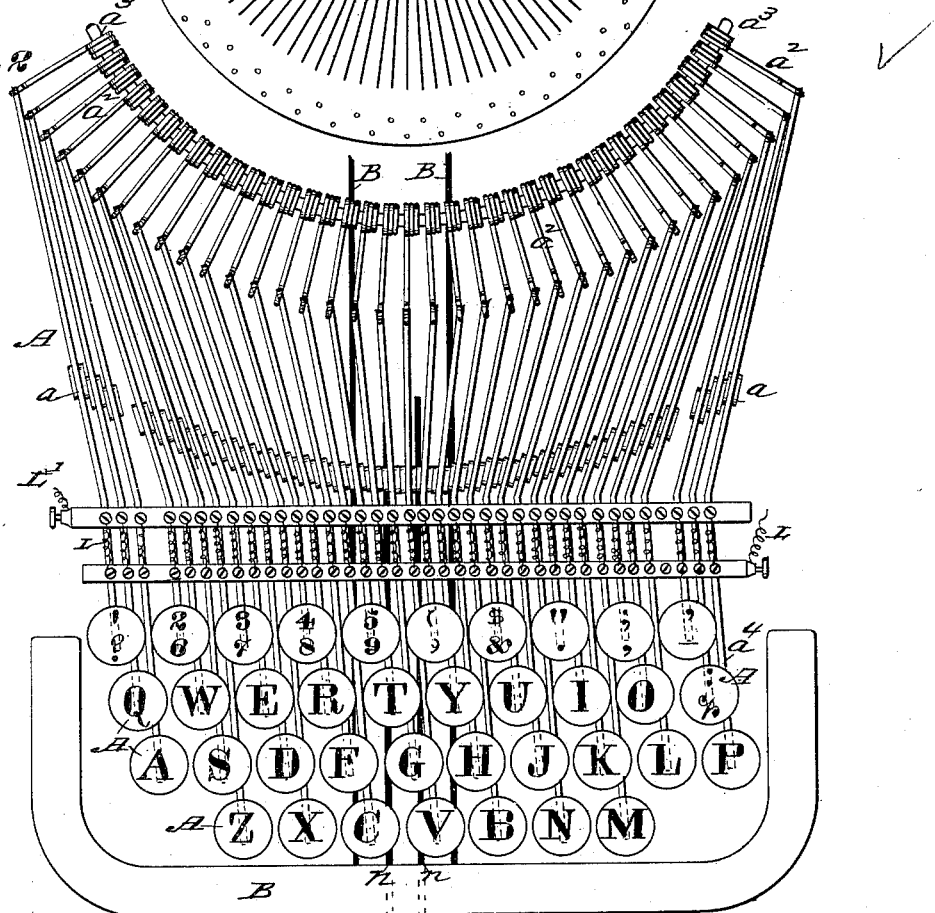
Attest:
Charles Pickles
J. A. Modica
Inventor:
George W. Baldrige
by C. D. Moody
atty

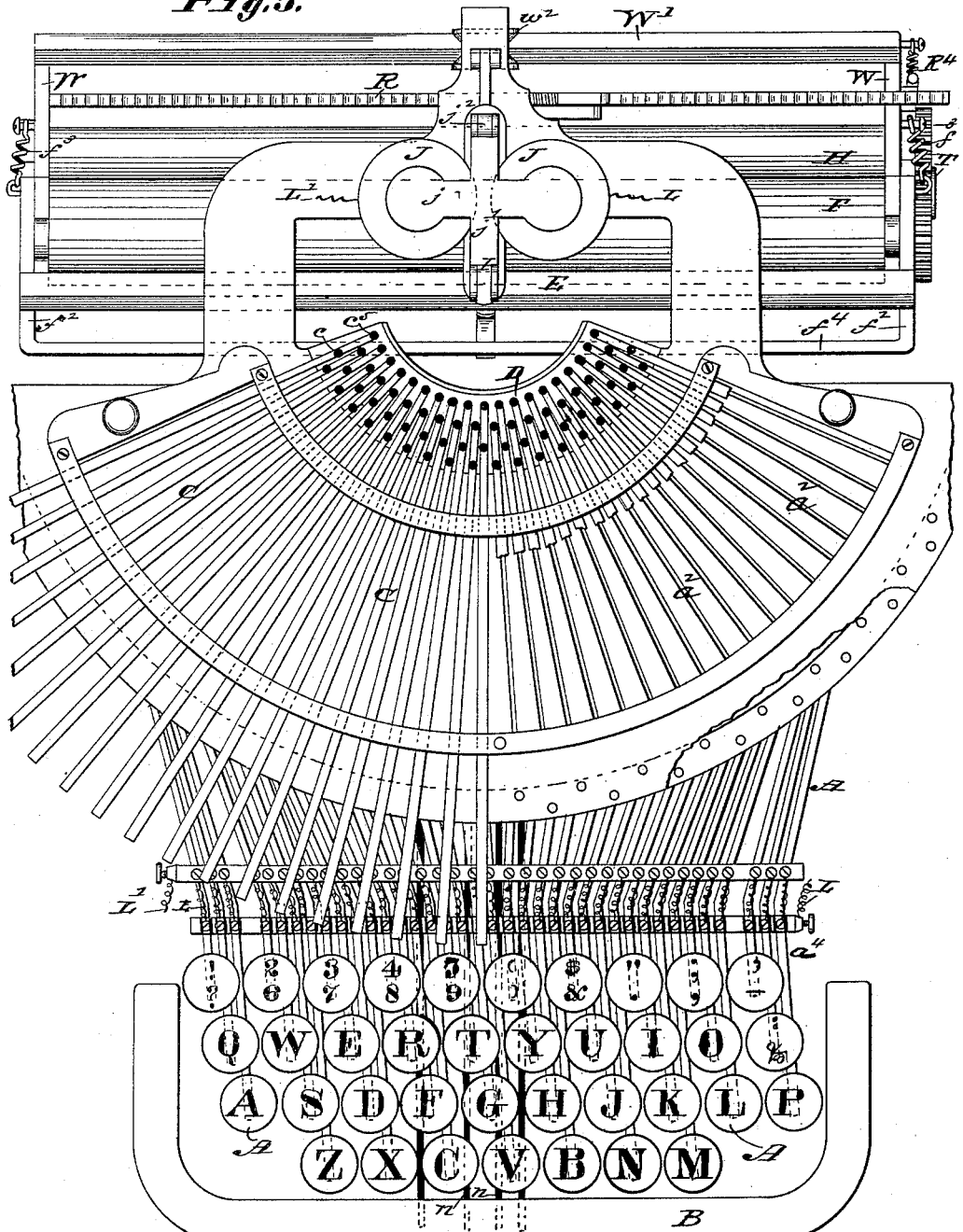

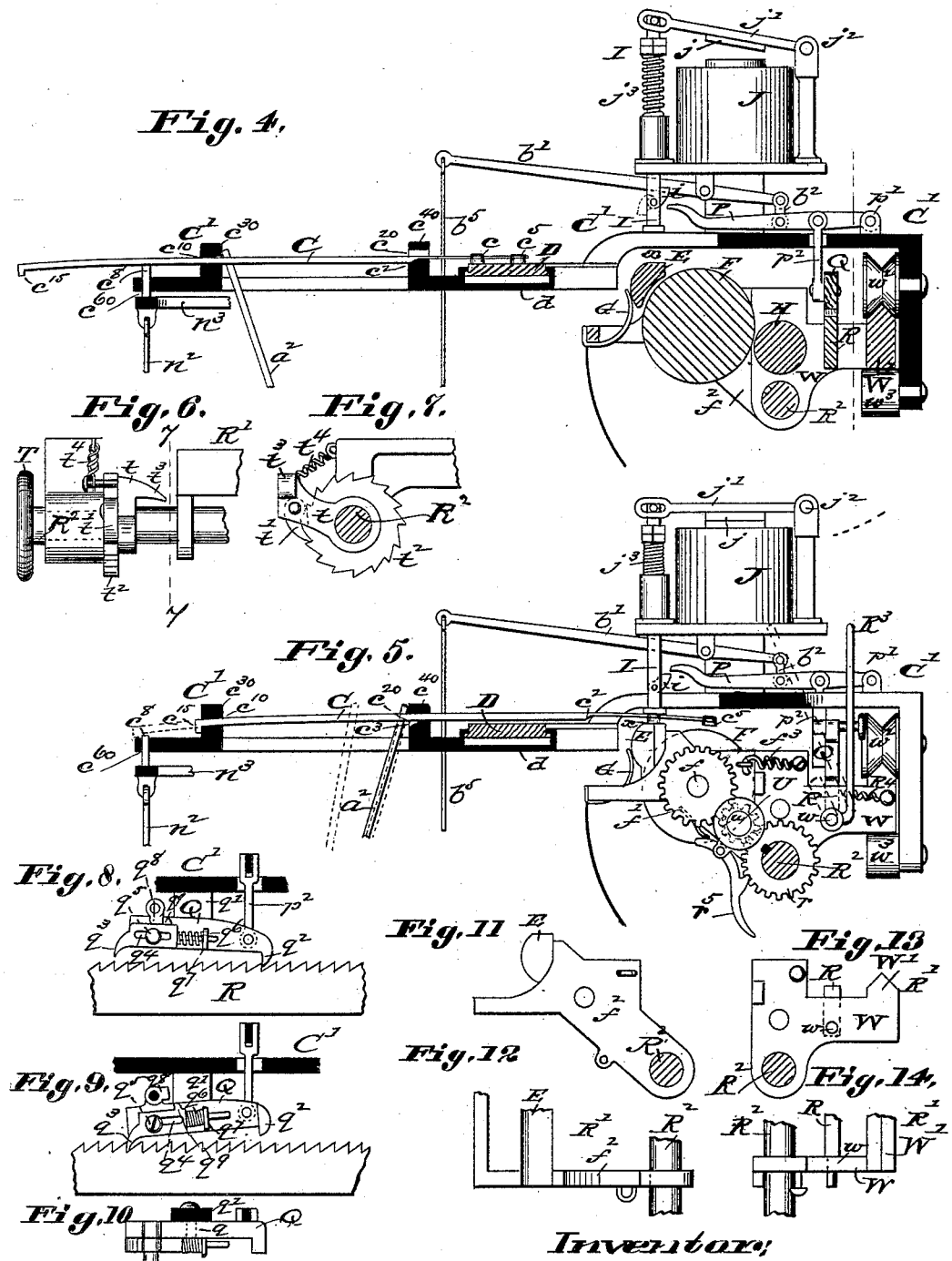

(No Model.)  
5 Sheets—Sheet 4.

G. W. BALDRIGE.
TYPE WRITING MACHINE.

No. 339,129. Patented Apr. 6, 1886.

Attest:
Charles Pickles
J. A. Modica

Inventor:
George W. Baldrige
by C. D. Moody
atty

N. PETERS, Photo-Lithographer, Washington, D. C.

(No Model.)

G. W. BALDRIGE.
TYPE WRITING MACHINE.

5 Sheets—Sheet 5.

No. 339,129. Patented Apr. 6, 1886.

Attest:
Charles Pickles,
Cora E. Hunt

Inventor:
George W. Baldrige
by C D Moody
atty

UNITED STATES PATENT OFFICE.

GEORGE W. BALDRIGE, OF ST. LOUIS, MISSOURI.

TYPE-WRITING MACHINE.

SPECIFICATION forming part of Letters Patent No. 339,129, dated April 6, 1886.

Application filed October 27, 1883. Renewed August 25, 1885. Serial No. 175,334. (No model.)

*To all whom it may concern:*

Be it known that I, GEORGE W. BALDRIGE, of St. Louis, Missouri, have made a new and useful Improvement in Type-Writing and Matrix-Making Machines, of which the following is a full, clear, and exact description, reference being had to the annexed drawings, making a part of this specification, in which—

Figure 15:
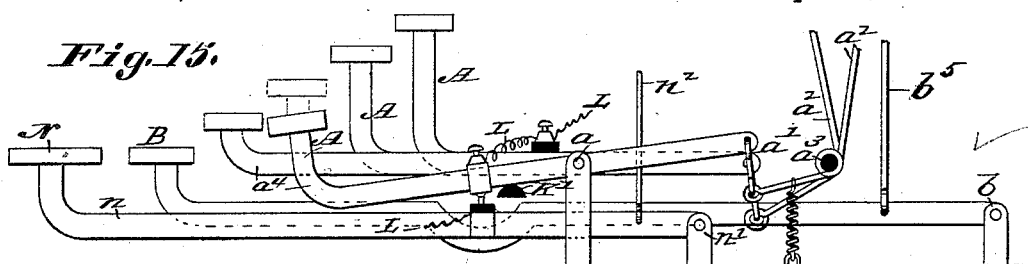
Figure 16:
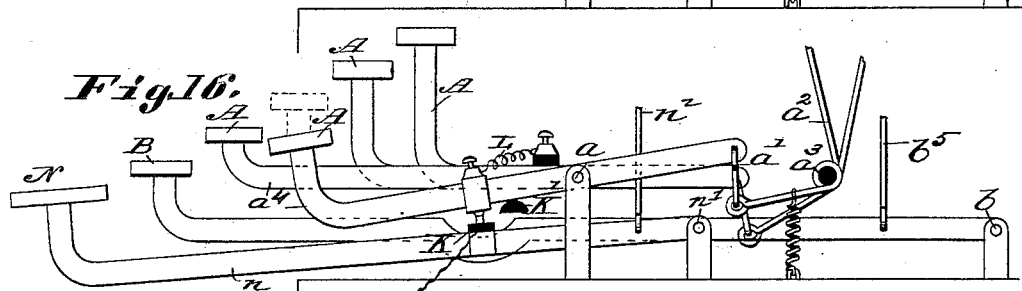
Figure 20:
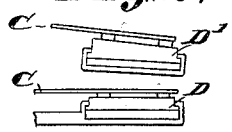
Figure 17:
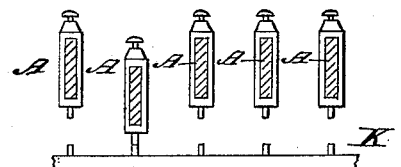
Figure 19:
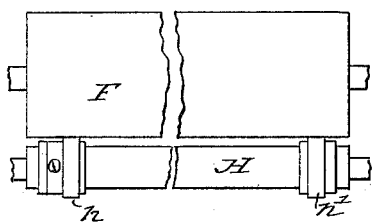
Figure 18:
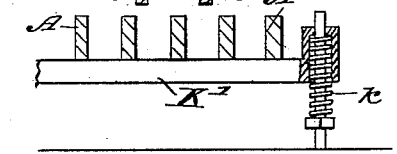
Figure 22:
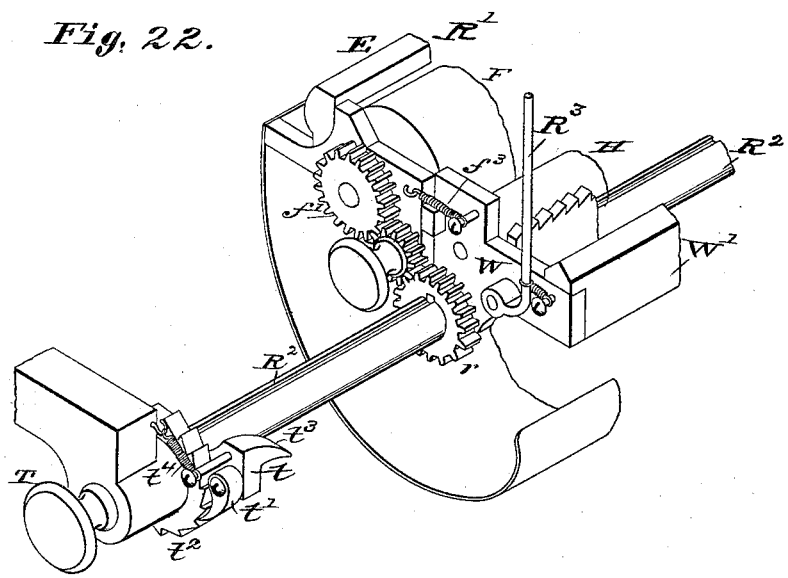
Figure 23:
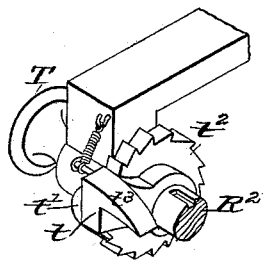

Figure 1 is a plan of the main part of the frame of the machine, the view being a general one and not showing the details; Fig. 2, a plan of the key-board and forward part of the machine which is shown in side elevation in Figs. 15 and 16; Fig. 3, a plan showing the principal portion of the machine, portions being broken away and the shaft $R^2$ not being shown; Fig. 4, a vertical longitudinal section of the upper rear part of the machine; Fig. 5, a similar section, but showing the parts in a different position and the mechanism immediately connected with the paper-carriage in side elevation; Fig. 6, a detail, being an elevation, showing the end of the shaft upon which the paper-carriage moves and the device upon the shaft for automatically rotating the paper-roll; Fig. 7, a section on the line 7 7 of Fig. 6; Figs. 8, 9, and 10, views of the mechanism used in spacing, Figs. 8 and 9 being side elevations and Fig. 10 a top view; Figs. 11 and 12, respectively, a side and a top view of one of the arms used to support the paper-roll and paper-supporting plate; Figs. 13 and 14, respectively, a side and a top view of the bracket in rear of the paper-cylinder; Fig. 15, a side elevation of the key-board, one of the lower-case keys being depressed; Fig. 16, a similar elevation, the parts being as when the upper-case letter is being printed; Fig. 17, a vertical cross-section taken through the key-board in front of the contact-bar; Fig. 18, a detail, being a vertical cross-sectional view showing in part the device for lifting the writing-keys; Fig. 19, a view of the rolls used in drawing the paper over the bearing-surface; Fig. 20, a detail indicating how two inking-pads might be used—that is, one above the other—and Fig. 21, a front elevation indicating a mode of connecting the writing-keys; Fig. 22, a view in perspective showing one of the ends of the paper-carriage and the parts therewith connected; and Fig. 23, a view in perspective from a different point of view of that of the preceding figure of the line-spacing mechanism.

The same letters of reference denote the same parts.

In the present machine the writing-keys are respectively connected with the type-bars. When the writing-keys are at rest the types rest upon an inked surface, and when the writing-keys are depressed they act to move the type-bars and lift the types which are attached to the type-bars, and have been inked by coming in contact with the inked surface, from the inked surface and transfer them into position for being impressed upon the paper it is desired to write upon. The writing-keys are successively operated and the types are successively brought into the same position, whence they are depressed and impressed upon the paper and then withdrawn into their original positions—that is, the types after being inked are impressed directly upon the paper. The force employed to impress the types is preferably obtained through an electric current, to which end a magnet is located in the vicinity of the point where the printing is done, and the magnet-armature is provided with an arm, which, when the circuit is closed, is moved against the type-lever, causing the type of the lever to be impressed upon the paper. The electric current is closed and opened by the writing-key, the key in its movement operating first to shift the type from the inked surface into position for printing, and then to close the circuit and effect the printing, after which, on releasing the key, the circuit is opened and the type lifted and withdrawn into its place upon the inked surface. Meanwhile, the paper-holding mechanism is suitably operated to enable the paper, as to spacing and lining, to be printed in the ordinary manner.

A A represent the writing-keys, and B the spacing-lever, constituting a key-board which resembles the key-board of an ordinary typewriter. The writing-keys at $a$ and the spacing-lever at $b$ are pivoted, to enable their forward ends to be depressed by the operator, and as indicated by the broken and full lines in Figs. 15, 16, and by means of a connection—such as the link $a'$ and lever $a^2$, journaled at $a^3$, Figs. 2, 15, 16—each writing-key is connected with its type-bar C, Figs. 3, 4, 5, so that when the forward end, $a^4$, of the key is depressed the type-bar C shall be moved from the position in Figs. 3, 4, into its position in Fig. 5. The type-bars are arranged as shown more distinctly in Fig. 3. They are supported and adapted to be moved longitudinally upon the frame C'. In their movement they should be properly guided. This is accomplished by passing the bar through the perforations $c^{10}$ $c^{20}$ in the flanges $c^{30}$ $c^{40}$, respectively, of the frame C'. The frame C' is extended circularly to enable the type-bars to be readily moved to and from the point where the printing is done. The lever $a^2$ is connected with its type-bar C, preferably by perforating the type-bar and passing the upper end of the lever $a^2$ through the perforation, substantially as shown in Figs. 4, 5.

D represents an inking pad or surface or part provided with ink. When the forward ends of the writing-keys are free, the types $c$ $c$ rest upon the pad D, as shown in Figs. 3, 4; but on depressing the end $a^4$ of the writing-key, its type-bar is moved rearward and the type of the bar is moved into the position $x$, Figs. 3, 4, and as indicated by the broken lines in Fig. 4.

As the ink upon the pad may be so thick as to make it undesirable to slide the type off the pad D, I cause the type-bar to be moved so as to first lift the type from the pad and then move it into the position $x$. The lifting is preferably accomplished by beveling the type-bar at $c^2$, and causing the bevel in the rearward movement of the type-bar to ride upward upon the bevel $c^3$ at the lower end of the perforation $c^{20}$, Figs. 4, 5, and thereby clear the pad. The perforations $c^{10}$ $c^{20}$ are suitably shaped to provide for the movements, as described, of the type-bar. The type-bar is so held and constructed that after the type has been moved into the position $x$ the rear end of the type-bar can be moved downward and the type pressed against the paper. A preferable mode of accomplishing this is to make the type-bar of springy material. This enables the type end of the bar to be bent downward, as shown in Fig. 5. Any construction, however, will answer which will permit of the type being properly separated from the pad, moved into the position $x$, and then depressed upon the paper being printed or written upon. A suitable stop, $c^8$, is used to limit the rearward movement of the type-lever, so that the types shall be brought exactly into the position $x$. Each type-lever C, at its forward end, is provided with a flange, $c^{15}$, which comes against the stop $c^8$. The paper being printed is fed over the bearing E, Figs. 3, 4, 5. The paper passes upward between the roll F and the pressure-plate G, over upon the bearing E, and thence downward between the rolls F and H, which rolls operate to draw the paper suitably over the bearing.

I represents an arm or plunger adapted to be moved downward upon the type-bar after its type $c$ has been moved into the position $x$, and thereby to cause the inked type to be impressed upon the paper. This plunger I, as stated, is preferably actuated by a magnet, such as the magnet J. This magnet is suitably connected with the frame of the machine. Its armature $j$ is attached to the lever $j'$, which in turn is journaled at $j^2$, and at its other end connected with the plunger I. On closing the circuit of the magnet its armature is drawn toward the magnet, and the plunger I, being attached to the magnet, is forced downward upon the type-bar C. An adjustable spring, $j^3$, acts to lift the plunger and armature as soon as the circuit is broken. The circuit is closed by depressing the key A, which, after the type has moved into the position $x$, comes, on the further depression of the key, into contact with the contact-bar K, Figs. 15, 16. Suitable wires, L L', connect the keys A A, respectively, with the contact-bar K, with the magnet J, and with a battery, (not shown,) so that on depressing any one of the keys A A, as described, the electric circuit through the magnet is closed and the armature and plunger caused to descend, as described.

To print both upper and lower case, each type-bar is provided with the two types, $c$ and $c^5$, which are relatively arranged upon the type-bar, as shown in Figs. 3, 4, 5. When a capital is to be printed, the key A is depressed further than in printing a lower-case letter. This causes the type-bar to be moved farther rearward, and so as to bring the upper-case type $c^5$ into the position $x$, as shown in Fig. 5. As there is a certain amount of lost motion in the various joints and bearings of the writing-key and type-lever, it is necessary to provide for insuring the bringing of the type, whether $c$ or $c^5$, exactly into the position $x$. To this end the lever $a^2$ is made of springy material, so that, when the upper end of the lever $a^2$ has reached its rearward limit, the lever springs and bends if the writing-key is further depressed. The operator then can freely depress the writing-key, and thereby force the type-lever properly into position without straining any of the parts.

To enable the type-bar to be moved farther rearward, for the purpose of printing the upper-case type, as described, the device shown in Figs. 2, 3, 15, 16, is employed.

N represents what may be termed the "upper-case" key. It may be arranged at any desirable part of the key-board, and, preferably, immediately at the center in front, as shown. By depressing this key N its lever $n$ is tilted on its pivot $n'$, and by means of the connecting-rod $n^2$, which leads from the lever $n$ thereto, the stop $c^8$ is drawn downward, as shown in Fig. 5, so as to be out of the way of the type-bar flange $c^{15}$. The type-bar is then by the further depression of the key, as described, moved rearward until the flange $c^{15}$ encounters the stop or flange $c^{40}$, and the type $c^5$ brought, as described, into the position $x$. The stop $c^8$ is, preferably, a pin adapted to be moved upward and downward in a perforation, $c^{60}$, in the frame C'. There are as many stops and perforations as there are type-bars, and to enable any one of the stops to be worked by the single key N the stops are attached to a single bar, $n^3$, and the rod $n^2$ connects directly with the bar $n^3$. As the plunger I rises, a pivoted pawl, $i$, Figs. 4, 5, upon the plunger, encounters and lifts a lever, P. This lever is pivoted at $p'$, and, by means of the link $p^2$, it is jointed to the dog Q, Figs. 4, 5, 8, 9, 10, which operates in connection with the rack R of the paper-carriage R'. The paper-carriage is adapted, by means of the ordinary spring, (not shown,) to be drawn to the left whenever the dog is out of engagement with the rack. The dog Q is, by means of the screw $q$, pivoted to the bracket $q'$, which depends from the frame C'. The lifting of the plunger acts to disengage the tooth $q^2$ of the dog, and to bring into engagement the tooth $q^3$, the latter entering the rack just before the escaping of the former. The tooth $q^3$, by means of the slot $q^4$ and screw $q^5$, is adjustable longitudinally upon the dog Q. When the tooth is moved one way, it compresses the spring $q^6$ against the shoulder $q^7$, and when the tooth $q^3$ is disengaged from the rack, the spring $q^6$ acts to move the tooth $q^3$ back again. The two positions of the tooth $q^3$ with relation to the tooth $q^2$ are shown, respectively, in Figs. 8, 9. The compression of the spring $q^6$ is effected by means of the mainspring (not shown, as stated) used to move the paper-carriage—that is, when the tooth $q^3$ enters the rack the spring $q^6$ yields, and, to the extent of its compression, the paper-carriage is moved and the desired spacing effected. When the plunger descends, the tooth $q^2$ is brought into engagement, and just before the escape of the tooth $q^3$ from the rack, and the carriage is held from moving until the tooth $q^3$ has again entered the rack and the spring $q^6$ is again compressed, and so on with every movement of the plunger. The dog Q may be adjusted to escape two teeth of the rack R by turning up the stop $q^8$, as in Fig. 9. This allows the rack to move farther than when the stop $q^8$ is turned down, as in Fig. 8. In the last-named position the stop $q^8$ comes in the way of the shoulder $q^9$, limiting the throw of the spring $q^6$ and causing the tooth $q^3$ to enter the rack sooner than when the spring $q^6$ has thrown the tooth $q^3$ farther from the tooth $q^2$. The stop $q^8$ is adapted (by means not shown) to turn from its position in Fig. 9 down into its position shown in Fig. 8, and no farther in that direction. The dog Q can be operated directly by means of the spacing-lever B, which is connected with the dog by means of the rod $b^5$, Figs. 4, 5, 15, 16, the lever $b'$, and the link $b^2$, the last-named part connecting with the lever P.

The line-spacing is effected by means of the button T, Figs. 6, 22, which is attached to the shaft R'. There is a shaft, U, between the shaft $R^2$ and the paper-roll shaft $f$, which is provided with a pinion, $u$, which engages with the pinion $f'$ upon the shaft $f$, and with the pinion $r$ upon the shaft $R^2$. By rotating the button the paper is fed between the rolls.

The line-spacing can also be effected automatically, as follows: by allowing the carriage R' at the end of its trip to encounter the lever $t$. This lever is provided with a pawl, $t'$, which engages with a ratchet, $t^2$, attached to the shaft $R^2$. The lever $t$ is loose, and can be turned upon the shaft $R^2$. The carriage R' in its movement encounters the bevel $t^3$ on the lever $t$, causing the lever to turn around on the shaft $R^2$, and through the pawl $t'$ to rotate the shaft $R^2$. As the carriage R' is withdrawn from the lever $t$ a spring, $t^4$, acts to draw the lever and pawl backward. There also may be a button on the shaft U for effecting the line-spacing by hand.

The roll F, by means of the arms $f^2 f^2$, Figs. 4, 5, 11, 12, is supported from the shaft $R^2$, and so that the roll, together with the other parts constituting the paper-carriage, can be moved transversely in the machine past the point $x$, and also so that the roll, together with the bearing E, can be swung upon the shaft $R^2$ downward from their position shown in the drawings, and into a position in which the paper can be readily inserted. The arms $f^2$ are upheld by means of the spring-hook $f^3$. The arms $f^2 f^2$ support the bearing E, and they are connected by the cross-bar $f^4$, Figs. 1, 3, which serves as a handle. The rear portion of the paper-carriage mechanism is upheld by the arms W W, Figs. 3, 4, 5, 13, 14. These arms extend upward and backward from the shaft $R^2$. The rack R is attached to them, and, preferably, so that the rack can be tilted in the bearings $w w$, Fig. 5, as indicated by the broken lines. For this purpose the rack is provided with a handle, $R^3$, by means of which the rack can be tilted in its bearings, and thereby thrown out of engagement with the dog Q, which is desirable when the carriage is to be moved rapidly across the machine. A spring, $R^4$, acts to draw the rack back into engagement with the dog Q when the handle $R^3$ is released. The spring-hooks $f^3$ at their fixed ends are fastened to the arms W W, and to hold the arms W W and the rear portion of the carriage mechanism properly in place the arms W W are provided with the bar W', Figs. 1, 3, 4, 5, 13, 14, which travels between the rollers $w^2 w^3$, which in turn are journaled in the frame C'. The contact-bar K is preferably attached to the upper-case lever, $u$. When the lever is not depressed, the contact is made with the bar K at the level shown in Fig. 15; but when the upper-case lever is depressed the keys A are pushed farther down and the contact is made at the lower level. (Shown in Fig. 16.) The writing-keys, after being depressed, are conveniently restored to their former positions and the type-bars drawn back by means of the lifting-bar K', Figs. 15, 16, 18. This bar underlies the keys and is supported upon the springs $k$. When any one of the keys A is depressed, the springs $k$ yield; but when the key is released the springs $k$ act to lift the bar and key.

To prevent the paper, after being printed, from being blurred by coming in contact with the roll H, the roll is provided with the rings or bosses $h$ $h'$, which bind the edges of the paper against the sheet F, but leave the printed portion of the sheet so that it will not be touched by the roll H. The roll $h$ or rolls $h$ $h'$ may be adjustable longitudinally on the roll H to suit sheets of different widths.

If desired, two inking-pads, D and D', may be used, as shown in Fig. 20—that is, if it is impracticable or undesirable to arrange the type-bars all at the same level, they can be in two sets, one above the other, and in such case there will be two inking-pads, D D', one above the other, as shown, one pad being for one set of the type-bars and the other pad for the other set; but, whether the types are inked upon the pad D or the pad D', they are suitably moved to bring them all into the same position $x$.

The present improvement is in part adapted to other work than ordinary type-writing. It can be employed for producing impressions upon or indentations in other material than paper—that is, in place of an inked type pressed upon paper and producing a print, any character, figure, or mark can be brought beneath the plunger I, and such character, figure, or mark can thereby be forced downward into a surface, such as wax, capable of being indented, and such indented surface can, for instance, be used in stereotyping; or the types $c$ may in place of ink be treated, touched, coated, or provided with a substance which resists the action of the acids, and the type thus coated can be moved into the position $x$, and then, by means of the plunger I, be forced downward against a metallic surface, causing the substance on the type to be transferred onto the metallic surface. Then such surface can be treated with acid and the parts thereof, where the substance referred to is not applied, can be eaten away.

The improvement also has relation to the mode of combining the keys for the purpose of operating a certain number of type-bars with keys fewer in number. This is done by combining two or more of the keys of the keyboard, so as to operate a third or fourth key.

Figure 21:
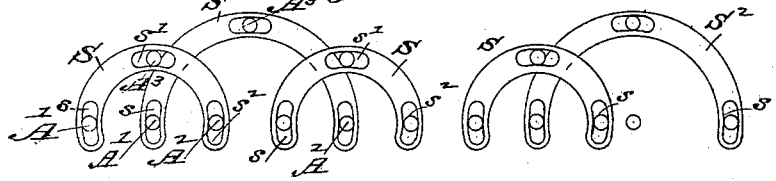

S S', &c., Fig. 21, represent what may be termed "yokes," having the loops $s$ $s'$ $s^2$. The keys A' A$^2$ pass through the loops $s$ $s^2$ at the ends of the yoke, and the key to be operated passes through the middle loop, $s'$, of the yoke. When it is desired to operate one of the keys—say the key A'—in the ordinary way, that key is depressed independently of the other keys, whereupon the yoke slips upon the other key of the pair and upon the intermediate key, allowing the first-named key to be operated without moving either the other key of the pair or the intermediate key. The loops are of sufficient length to permit of this being done. The other key, A$^2$, of the pair can be similarly independently moved; but when it is desired to move the intermediate key, A$^3$, the two keys A A' are simultaneously depressed against the lower ends of the loops $s$ $s^2$ and made to draw the intermediate key, A$^3$, down. Any other two of the keys can be similarly yoked for producing a similar result. The principle can be extended. Two pairs of yoked keys can be simultaneously operated in order to move two intermediate keys, which two intermediate keys may in turn operate a third. The pawl $i$ can be turned over, as indicated by the dotted lines, Fig. 4, so as to be out of the way of the lever P when it is not desired to use the spacing mechanism.

The pivoted pawl $r^5$, Fig. 5, is intended for steadying the motion of the rolls F H. The pawl by means of a suitable spring is pressed gently into the gear $r$, but not with sufficient force to arrest the proper motion of the gear—that is, the pawl yields and allows the gear to rotate.

The roll F may, so far as the type-levers, magnet, and magnet-plunger are concerned, be substituted for the fixed bearing-surface E.

It will be noticed that the armature-arm $j'$ is not made in one piece with the plunger, but adapted to bear loosely thereupon, and in such manner as to enable the plunger to be pressed directly downward through a guide against the type-bar. This insures a proper application of the type to the paper. If the armature-arm and plunger were made in one piece the lower end of the plunger would strike most of the type-bars at such an angle as to cause them to bend more or less to one side or the other of the point $x$, and the type-impressions in consequence would be imperfectly made. The flexibility of the type-bars would increase the difficulty. By constructing and operating the plunger, as described, this difficulty is obviated.

In the above specification the invention has been described as a type-writer, and corresponding terms have been applied to the various parts of the machine. It is to be understood, however, that the invention is well adapted for use as a type-matrix-making machine.

I claim—

1. In a type-writing and matrix-making machine, the combination of the pad D, the frame C', having bevels $c^3$, and the type-bars C C, having the bevels $c^2$, said bars in starting being lifted from the pad by means of the bevels $c^2$ $c^3$, as and for the purpose described.

2. In a type-writing and matrix-making machine, the combination of the magnet J, the plunger I, the elastic type-bar C, and the bearing E, substantially as described.

3. In a type-writing and matrix-making machine, the combination of the frame C', the elastic type-bars C C, the pad D, the magnet J, the plunger I, and the bearing E, substantially as described.

4. In a type-writing and matrix-making machine, the combination of the frame C', the keys A A, the connections $a'$ $a^2$, the type-bars C C, the pad D, the magnet J, the plunger I, and the bearing E, substantially as described.

5. In a type-writing and matrix-making machine, the combination of the keys A A, the upper-case lever N, and the contact-bar K, substantially as described.

6. In a type-writing and matrix-making machine, the combination of the lever B, the rod $b^5$, the lever $b'$, the link $b^2$, the lever P, the link $p^2$, the dog Q, and the rack R, substantially as described.

7. In a type-writing and matrix-making machine, the combination of the keys A A, the connections $a'$ $a^2$, movable contact-bar K, type-bars C C, lever N, the rod $n^2$, the frame C′, and the stop $c^8$, for the purpose described.

8. In a type-writing and matrix-making machine, the combination of the carriage R′, the feed-rolls H F, the pinions connecting the feed-rolls, the shaft $R^2$, the lever $t$, the pawl $t'$, and the ratchet $t^2$, as and for the purpose described.

9. In a type-writing and matrix-making machine, the combination of the keys $A'$ $A^2$ $A^3$ and the yoke S, substantially as and for the purpose set forth.

10. In a type-writing and matrix-making machine, the combination of the severally-movable elastic type-bars C C, the plunger I, and the bearing-surface E, substantially as described.

11. The combination of the key A, the elastic connections $a'$ $a^2$, the frame C′, and the type-bar C, to allow the plunger to rise sufficiently to clear the type-bar before said connection acts to draw the type-bar back.

12. In a type-writing and matrix-making machine, the combination of the connection $a^2$, the type-bar C, and the flanges $c^{30}$ $c^{40}$, said connection $a^2$ being jointed to said type-bar between said flanges for the purpose of moving the type-bar properly.

13. In a type-writing and matrix-making machine, the combination of the shaft $R^2$, the arms W W, the bar W′, the frame C′, and the rollers $w^2$ $w^3$, substantially as described.

14. In a type-writing and matrix-making machine, the combination of the shaft $R^2$, the arm $f^2$ $f^2$ W W, and the hooks $f^3$ $f^3$, as and for the purpose described.

GEORGE W. BALDRIGE.

Witnesses:
C. D. MOODY,
SALEM G. CLARK.